United States Patent [19]

Amrany

[11] Patent Number: 5,530,959

[45] Date of Patent: Jun. 25, 1996

[54] SELF-SYNCHRONIZING SCRAMBLER/DESCRAMBLER WITHOUT ERROR MULTIPLICATION

[75] Inventor: Daniel Amrany, Wayside, N.J.

[73] Assignee: AT&T Corp., Murray Hill, N.J.

[21] Appl. No.: 245,755

[22] Filed: May 18, 1994

[51] Int. Cl.⁶ .................................................. H04L 9/12
[52] U.S. Cl. .......................... 380/48; 380/21; 380/49; 380/50
[58] Field of Search ........................... 380/21, 48, 49, 380/50

[56] References Cited

U.S. PATENT DOCUMENTS

| | | | |
|---|---|---|---|
| 3,920,894 | 11/1975 | Shirley et al. | 380/46 |
| 4,304,962 | 12/1981 | Fracassi et al. | 178/22.12 |
| 4,663,500 | 5/1987 | Okamoto et al. | 380/47 |
| 4,817,148 | 3/1989 | Lafferty et al. | 380/48 |
| 4,856,063 | 8/1989 | McCalmont | 380/48 |
| 5,235,645 | 8/1993 | Stocker | 380/48 |
| 5,241,602 | 8/1993 | Lee et al. | 380/44 |
| 5,321,754 | 6/1994 | Fisher et al. | 380/48 |

OTHER PUBLICATIONS

Hewlett–Packard Journal, Mar. 1976, USA. vol. 27, No. 7, ISSN 0018–1153, pp. 18–24, "A 50–Mbit/s pattern generator and error detector for evaluating digital communications system performance" by I. R. Young et al. Comment: Listed as particularly relevant if combined with another document of the same category, on European Search Report for European Application No. 95303159.8.
Nachrichtentechnische Zeitschrift, Dec. 1974, West Germany, vol. 27, No. 12, ISSN 0027–707X, Muller, H.; "Bit sequence independence through scramblers in digital communication systems", p. 476, left column, line 37–line 56, figures 2,6. Comment: Listed as particularly relevant if combined with another document of the same category, on European Search Report for European Application No. 95303159.8.

Patent Abstracts of Japan, vol. 005 No. 198 (E–087), 16 Dec. 1981 & JP-A-56 122542 (Fujitsu Ltd; Others: 01, 26 Sep. 1981 *Abstract* Comment: Astract listed as technological background on European Search Report for European Application No. 95303159.8.
AT&T Technical Journal, Sep.–Oct. 1986, USA, vol. 65, No. 5, ISSN 8756–2324, pp. 123–136, Doowhan Choi: "Parallel scrambling techniques for digital multiplexers" Comment: Listed as particularly relevant if combined with another document of the same category, on European Search Report for European Application No. 95303159.8.
European Search Report dated Aug. 31, 1995, regarding EPO Application No. EP 95303159.8.
W. Wesley Peterson and E. J. Weldon, Jr., "Error–Correcting Codes", Second Edition, Jul. 1981, The MIT Press, pp. 206–211, 472–492.

*Primary Examiner*—Gilberto Barrón, Jr.
*Attorney, Agent, or Firm*—Joseph J. Opalach

[57] ABSTRACT

A self-synchronizing scrambler/descrambler arrangement operates in two modes. In the first, or start-up mode, predetermined data is coupled to the scrambler and transmitted to the descrambler. This data is used to "seed", i.e., load, storage devices in the scrambler and descrambler with the same information. After a predetermined time interval, the start-up mode is terminated, and the scrambler and descrambler each operate in a steady-state mode. In this mode, the information loaded in the scrambler and descrambler devices are used to form the scrambler and descrambler key signals. Advantageously, in the steady-state mode, the occurrence of transmission errors does not effect the contents of the storage devices in the scrambler and descrambler. Hence, the prior art problem of error multiplication is avoided. In applications where a number of coded and multiplexed data channels are communicated over the communications channel linking the scrambler and descrambler, this approach allows the use of a single scrambler/descrambler without degrading the coding benefits.

17 Claims, 4 Drawing Sheets

400

1

SELF-SYNCHRONIZING SCRAMBLER/DESCRAMBLER WITHOUT ERROR MULTIPLICATION

TECHNICAL FIELD

The present invention relates to a scrambling and descrambling technique which is self-synchonizing and avoids error multiplication problems.

BACKGROUND OF THE INVENTION

Scrambling of digital signals is routinely used in certain communications applications. In others, such as data communications systems, scrambling is typically done to assure transitions in the received data signal and thereby avoid loss of synchronization in the data recovery process. It is also used to assure "whiteness" of data for adaptive processors. Transmission delays across the communications channel are never constant, and, as such, there is always a need to synchronize the scrambler and descrambler with the inherently unknown system delay. One commonly-used prior art self-synchronizing arrangement scrambles/descrambles using a "key" signal. Within the transmitter, the data signal is scrambled using the key signal while, within the receiver, the received scrambled data signal is descrambled using the same key signal. The key signal is typically derived from the scrambled data signal is the scrambler and descrambler. The problem with this arrangement is that a single difference between the transmitted and received scrambled data signal results in a multiplication of errors in the descrambled data signal. In an effort to avoid the above described error multiplication problem, a technique known as "closed-loop" scrambling/descrambling has been done. In this mode of scrambling, the keys stored in the scrambler and descrambler are prestored and are updated only using the contents stored in each register. As a result, the updating is independent of errors in the received signal and the problem of error multiplication is avoided. There are two major shortcomings with closed loop scrambling/descrambling. First, synchronization of the scrambler and descrambler operations must be provided by communicating signals between these devices in addition to the scrambled data. In certain applications, such as high-speed voice and video applications, this is difficult and expensive to implement. Second, seeding the scrambler and descrambler with the same information for forming the initial key signals is oftentimes impractical for certain system applications. It would, therefore, be extremely desirable if an inexpensive, easy to implement, self-synchronizing, scrambling/descrambling arrangement could be provided which overcomes the problem of error multiplication.

SUMMARY OF THE INVENTION

Pursuant to the present invention, a self-synchronizing scrambler/descrambler arrangement is proposed wherein the scrambler is "seeded" or provided with predetermined data during a start-up time interval. In this interval, the predetermined data or seed is stored in the scrambler and descrambler. After this start-up interval, the scrambler and descrambler each operate in a "closed-loop" mode wherein the presence of errors in the received scrambled data does not produce error multiplication. Advantageously, this arrangement can be used in applications where as a single data channel is communicated between the scrambler and descrambler as well as applications where a number of multiplexed data channels are communicated.

DETAILED DESCRIPTION

Figure 1:
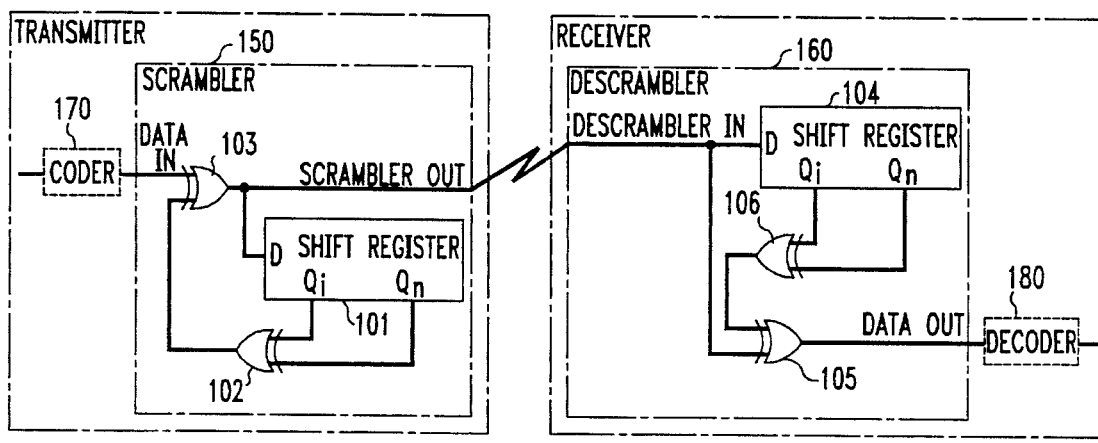
FIGS. 1–3 are each a block schematic diagram of different prior art scrambling/descrambling arrangements.

The prior art problem of error multiplication with scrambler/descrambler arrangements using keys is shown in FIG. 1. Illustrative prior art self-synchronizing scrambling/descrambling arrangement 100 includes scrambler 150 and descrambler 160. Within the scrambler, shift register 101 stores information and exclusive-OR gate 102 modulo-2 adds the contents of two predetermined shift register locations to form the key signal. For purposes of illustration, it shall be assumed in this discussion that two locations are used and these are designated as $Q_i$ and $Q_n$. Of course, as is well-known in the art, more than two locations may be used. Exclusive-OR gate 103 scrambles the data using the key signal. The scrambled data is transmitted and also coupled to shift register 101. Within the receiver, the scrambled data is coupled to shift register 104 and exclusive-OR gate 105. The descrambling is provided by modulo-2 adding or "half-adding" scrambled data with the key signal formed by exclusive-OR gate 106. Gate 106 forms this key signal, which is identical to that used in the scrambler, by half-adding the contents of shift register locations $Q_i$ and $Q_n$. The problem of error multiplication arises because a single error in the state of the descrambler input signal, relative to its transmitted counterpart, is coupled to shift register 104 in the descrambler where it will subsequently appear at least two times in the formation of the descrambler key signal. The signal coupled to scrambler 150 may be an uncoded digital signal or may be a coded digital signal. The addition of coder 170 and decoder 180 reflects the latter case. The coding scheme employed includes block, e.g., Reed-Solomon, and trellis, e.g. convolutional, coding. In any event, the problem of error multiplication is especially troublesome since decoder performance is significantly deteriorated.

Figure 2:
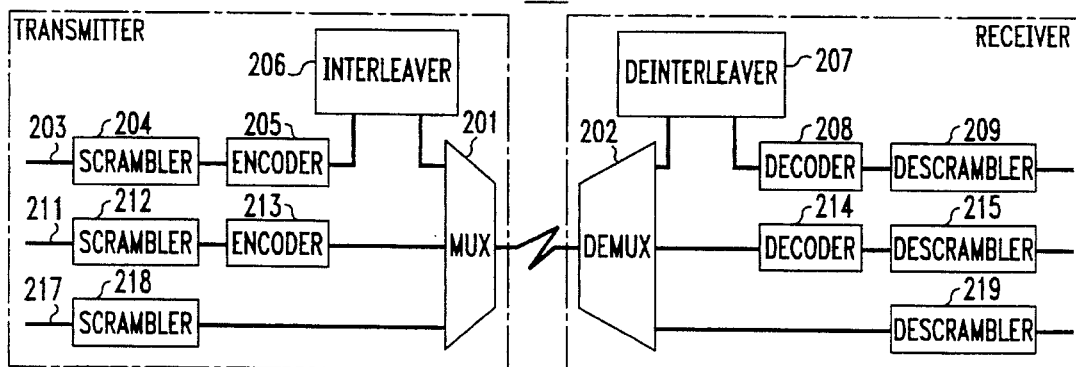

One prior art solution to overcome the problem of error multiplication on the coding operation is to reverse the positioning of coder 170 and scrambler 150 in the transmitter and reverse the positioning of descrambler 160 and decoder 180 in the receiver. With such apparatus reversal, the multiplication of errors provided at the descrambler output is not coupled to the decoder. This solution, however, increases start-up delay and presents difficulties in synchronizing the receiver to the incoming data. In applications where multiple data channels are communicated between a transmitter and receiver in a multiplexed fashion, the reversal of coder and scrambler, decoder and descrambler have been expanded, resulting in the rather complex arrangement shown in FIG. 2 wherein a separate scrambler/descrambler pair is used for each data channel. In the illustrative embodiment shown in FIG. 2, there may be some data channels that need data corrections, some that need interleaving, and some that require neither. Specifically, three such data channels are shown in FIG. 2 which are respectively multiplexed by multiplexer (MUX) 201 and demultiplexed by demultiplexer (DEMUX) 202. For one of these data channels, the digital data on lead 203 is respectively scrambled, encoded and interleaved by scrambler 204, encoder 205 and interleaver 206. The inverse operations in the receiver are provided by deinterleaver 207, decoder 208 and descrambler 209 to recover the digital data on lead 203 at the output of descrambler 209. For another of these data channels, the digital signal on lead 211 is processed by scrambler 212 and encoder 213 and decoded by decoder 214 and descrambler 215. Finally, for still another of these data channels, an uncoded signal on lead 217 is respectively coupled to scrambler 218 prior to transmission and then, upon receipt in the receiver, supplied to descrambler 219.

Figure 3:
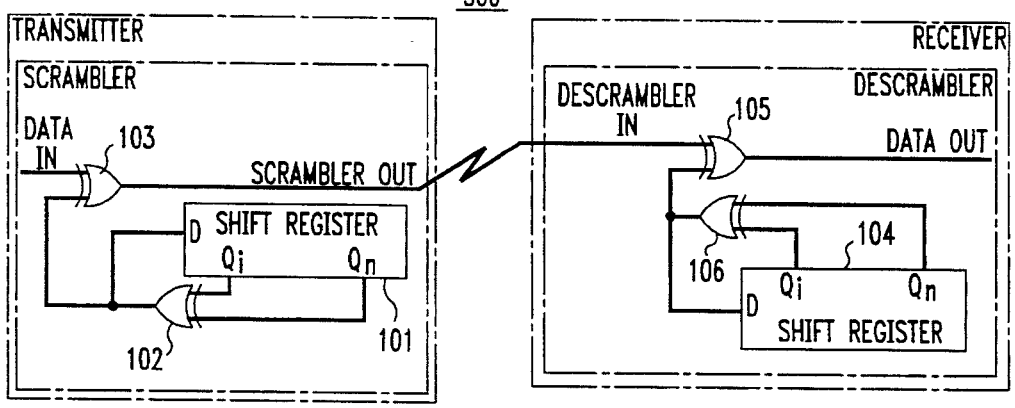

Another prior art technique to avoid the problem of error multiplication is to utilize what is known as "closed-loop" scrambling/descrambling. An illustrative embodiment 300 of this approach is shown in FIG. 3. Referring to this figure, the contents stored in the scrambler register 101 and descrambler register 104 which are used to respectively form the key signal in the scrambler and descrambler are each updated only as a function of their initially stored contents. That is, the scrambled data is not coupled into shift register 101 and, within the descrambler, the received scrambled data is not coupled into shift register 104 as they are in FIG. 1. Consequently, there is no problem of error multiplication since a single error in data propagation from the scrambler to the descrambler does not cause a plurality of errors. While a closed-loop arrangement avoids the problem of error multiplication, the contents of the scrambler and descrambler shift registers must be initialized with the same digital sequence and, most importantly, the operation of these devices must be synchronized by signals which are not shown in FIG. 3. Providing such synchronization signals is difficult and expensive to implement, especially in high speed data communication systems.

Figure 4:
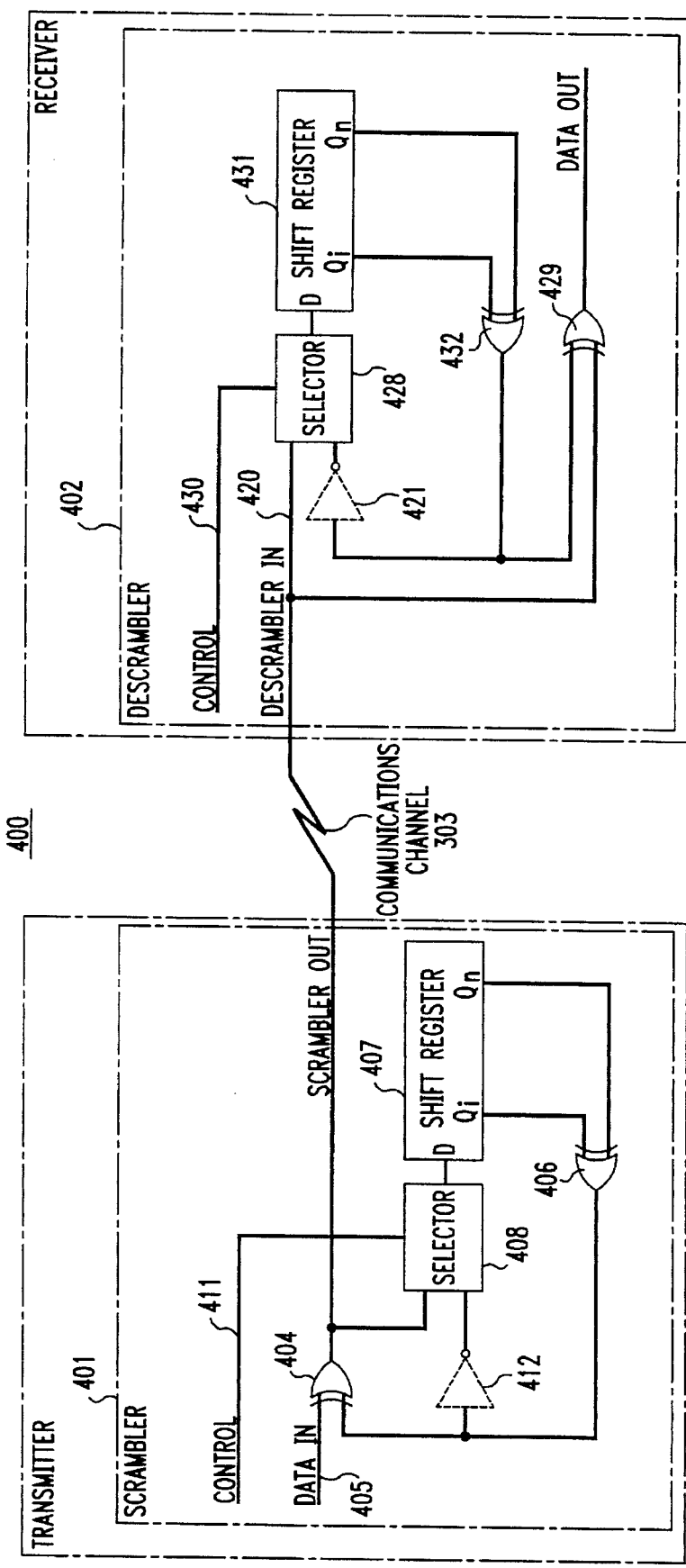
FIG. 4 is a block schematic diagram of one embodiment of a scrambling/descrambling arrangement in accordance with the present invention.

With the above background, this discussion will now focus on the present invention. Refer now to FIG. 4 which shows a first embodiment 400 of the present invention. As shown, scrambler 401 includes exclusive-OR gates 404 and 406, shift register 407, selector 408, and inverter 412. Descrambler 402 includes shift register 431, exclusive-OR gates 429 and 432, selector 428, and inverter 421. The number of locations, or the length of shift register 407 and 431, are the same. The number of storage locations in each of shift registers 407 and 431 and the locations therein, which are respectively connected to the inputs of exclusive-OR gate 406 and 432, are selected using well-known techniques to provide a certain amount of randomness to the scrambling/descrambling operation. See, for example, a textbook entitled "Error-Correcting Codes" by W. Wesley Peterson and E. J. Weldon, Jr., MIT Press, 1972 edition. For illustrative purposes, the key signal is formed using the contents of two register locations, it being understood that the contents of a plurality of locations could be combined in well-known fashion.

Scrambling/descrambling arrangement 400 operates in two modes. During the first or start-up mode, predetermined data is supplied on lead 405 to the scrambler, and this data is scrambled and transmitted through communications channel 403 to the descrambler. The scrambled predetermined data "seeds" the scrambler and descrambler, i.e., it is stored and used to form the key signal in both the scrambler and descrambler. In the second, or steady-state mode, which begins after the start-up mode has persisted for a predetermined time interval, data which is not known is coupled to lead 405 and the scrambler and descrambler each operate in a closed loop arrangement forming their key signal using the scrambled predetermined data.

In either of the two aforementioned modes, exclusive-OR gate 404 scrambles the data on lead 405 by half-adding it with a key signal formed at the output of exclusive-OR gate 406. As in the prior art, gate 406 forms this key signal by half-adding the contents of two or more locations in shift register 407. For purposes of illustration, it will be assumed that two shift register locations are used to form the key signal, and these locations are designated as $Q_i$ and $Q_n$. The scrambled data is transmitted through the communications channel and coupled to the descrambler. Within the descrambler, the received scrambled data is coupled to selector 428 and exclusive-OR gate 429. Exclusive-OR gate 432 forms the descrambler key signal by half-adding the contents of locations in shift register 431 which correspond to those used to form the scrambler key signal. These descrambler shift register locations are also designated as $Q_i$ and $Q_n$. Exclusive-OR gate 429 descrambles the received scrambled data by half-adding it with the descrambler key signal.

In the scrambler, selector 408, under the control of a signal on lead 411, couples either the output of inverter 412 or the output of exclusive-OR gate 404 into shift register 407. In similar fashion, within the descrambler, selector 428, under the control of a signal on lead 430, couples either the received scrambled data on lead 420 or the output of inverter 421 into shift register 431. During the start-up mode, selector 408 in the scrambler couples the output of exclusive-OR gate 404 into shift register 407 and selector 428 in the descrambler couples the signal on lead 420 into register 431. In the absence of transmission errors during the start-up mode, the signal on lead 420, which is fed to register 431, is identical to the transmitted scrambled signal which is coupled to register 407. Accordingly, the scrambler and descrambler are each seeded with the same keyforming signals and the sequence of key signals formed in the descrambler by exclusive-OR gate 432 will be identical and offset in time by the communication channel delay to the sequence of key signals formed by exclusive-OR gate 406 in the scrambler. In the steady-state mode, the scrambler and descrambler each operate in closed loop fashion wherein the presence of transmission errors does not result in error multiplication. Specifically, in the steady-state mode, both the scrambler and descrambler operate in a manner where the respective key signals are "recycled". That is, the key signal formed by exclusive-OR gate 406 is inverted and coupled to shift register 407, while the key signal formed by exclusive-OR gate 432 is inverted by inverter 421 and coupled through selector 428 to shift register 431.

For the duration of a predetermined time interval, hereinafter referred to as the start-up time interval, assume that a series of logical "1" signals are coupled to lead 405. For a first predetermined portion of the start-up time interval, scrambler 401 operates in the startup mode and thereafter operates in the steady-state mode. Similarly, during a second predetermined portion of the start-up time interval, descrambler 402 operates in the start-up mode and thereafter operates in the steady-state mode. The first and second predetermined time intervals can be the same or different, i.e., the change in the scrambler and descrambler operating modes need not be synchronized Advantageously, this feature eliminates the need for the transmission of a special synchronization control signal between the scrambler and descrambler.

Now, to understand the self-synchronizing aspect of the present invention, it should be noted that during the start-up time interval when logical "1s" are coupled to lead 405, the output of exclusive-OR gate 404 is the inverse of the output of exclusive-OR gate 406. Inverter 412 inverts the output of gate 406. Consequently, during the start-up time interval, the outputs of inverter 412 and gate 404 are identical. Therefore, changing the scrambler from the start-up to the steady-state mode does not change the seeding of shift register 407. Referring to the descrambler, during the start-up time interval, the output of exclusive-OR gate 429 is logical "1". That is, in the absence of errors, the descrambler recovers the logical "1" signal on lead 405. If we designate the signal on lead 420 during the start-up time interval as s, then the output of exclusive-OR gate 432 is the inverse of s or $\bar{s}$. Inverter 421 inverts $\bar{s}$ to yield s. Therefore, during the start-up time interval the signal on lead 420 and the output of inverter 421 are the same. Since the output of gate 404 and inverter 412 are the same and the signal on lead 420 and the output of inverter 421 are the same, the scrambler and descrambler can each change from the start-up mode to the steady-state mode independent of one another, without regard to synchronization and switching speed so long as the scrambler and descrambler each change from the start-up to the steady-state mode within the start-up time interval.

The duration of the start-up interval, i.e., the time interval in which logical "1s" are communicated on lead 405, should be, at a minimum, that time interval necessary to entirely fill shift register 431, including channel delay, with the same contents as shift register 407. It may, of course, be desirable to lengthen the duration of the start-up interval above the minimum time interval if transmission errors are more likely when communications between the scrambler and descrambler first begin.

The signal coupled to lead 405 need not be a logical "1" during the start-up time interval. Alternatively, for example, a sequence of logical "0s" can be coupled to lead 405 during this time interval and, if so, the use of inverters 412 and 421 can be eliminated. For this reason, these inverters are shown in phantom dotted lines in FIG. 4. However, if a sequence of logical "0s" is used during the start-up time then the contents of shift registers 407 and 431 should be initialized with values other than all zeroes. Otherwise, the scrambler and the descrambler will be seeded in both the start-up and steady-state mode with a sequence of logical "0s", the scrambler and descrambler will "lock-up" and no scrambling/descrambling will be provided.

Figure 5:
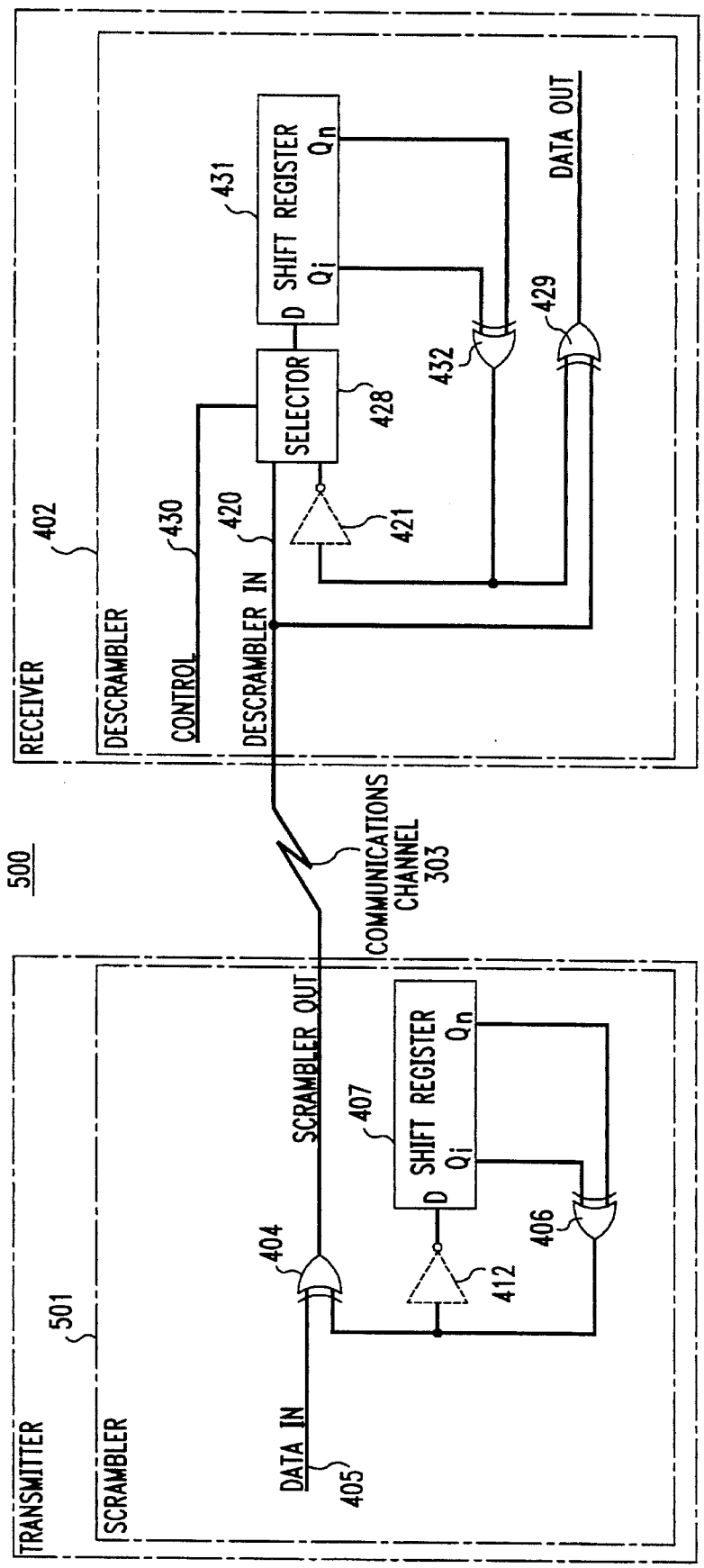
FIG. 5 is a block-schematic diagram of another embodiment of a scrambler/descrambler arrangement in accordance with the present invention.

It has been recognized that if there is no other need for self-synchronization with random data, the scrambler can always operate in the closed loop mode thereby eliminating the need for selector 408. Refer now to FIG. 5 which shows scrambling/descrambling arrangement 500 which incorporates this notion. In scrambler 501, the use of selector 408 has been eliminated and during start-up and steady-state mode operation, the output of inverter 412 is coupled into shift register 407. Assuming that logical "1s" are coupled to lead 405 during the start-up time interval, exclusive-OR gate 404 inverts the output of exclusive-OR gate 406. Inverter 412, in addition to its previously described function, now also assures that what is coupled to the descrambler is also loaded into shift register 407. Scrambler 501 couples scrambled data through communications channel 303 to descrambler 402 which operates as described above for FIG. 4. During start-up, the received signal on lead 420 is coupled to shift register 431. After start-up, the output of exclusive-OR gate 432 is coupled to shift register 431. If logical "0s" are coupled on lead 405 during start-up, then the use of inverters 412 and 421, as with the embodiment 400 shown in FIG. 4, can be eliminated in embodiment 500 shown in FIG. 5.

Figure 6:
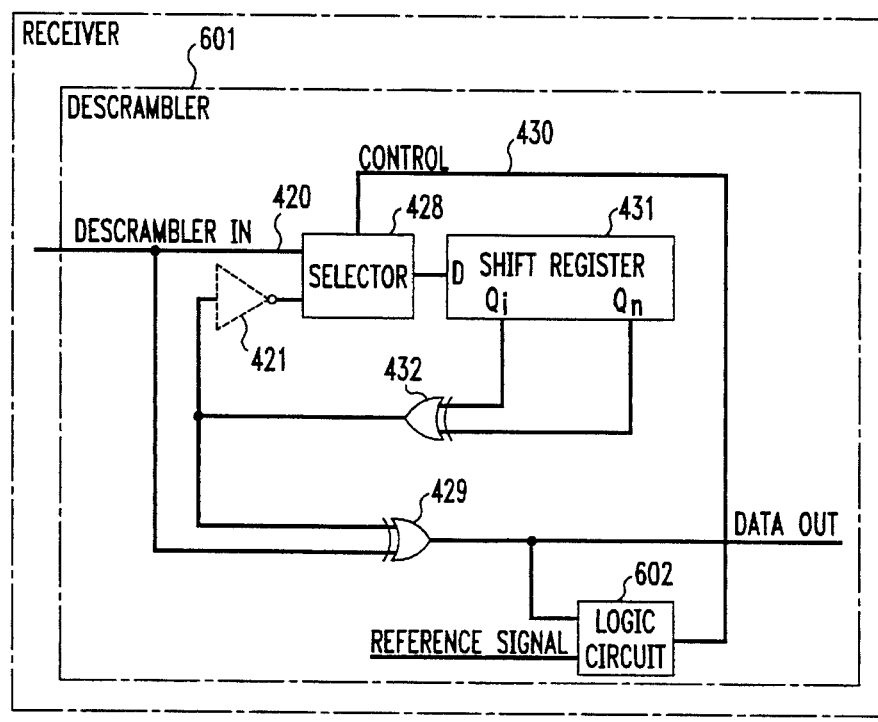
FIG. 6 is a block-schematic diagram of a descrambler which may be used in lieu of the descrambler shown in FIGS. 4 and 5.

In either arrangement 400 or 500, the toggling of selector 428 in the descrambler occurs after the start-up time interval has persisted for a predetermined time interval, which should be sufficient to assure that the contents of shift registers 431 and 407 are identical. In applications where the communications channel is noisy, errors may occur during signal propagation more frequently. In such cases, it is desirable to utilize the descrambler 601 shown in FIG. 6. Descrambler 601 is identical to descrambler 402 except for the addition of logic circuit 602. Circuit 602 provides the control signal on lead 430. Logic circuit 602 compares the descrambler output to a reference signal which is identical to the predetermined signal coupled to scrambler lead 405 during the start-up time interval; e.g., constant logical "1" or "0". For error-free operation, the descrambled output should be identical to the signal on lead 405. Logic circuit 603 compares the descrambler output to the reference signal. Assuming that shift register 431 has N locations, after logic circuit 602 determines that N consecutive descrambler outputs are equal to the reference signal, a control signal is provided on lead 430 which causes the descrambler to operate in the steady-state or closed-loop mode. Consequently, with the addition of logic circuit 602, the seeding of shift registers 431 and 407 with identical data is assured.

Figure 7:
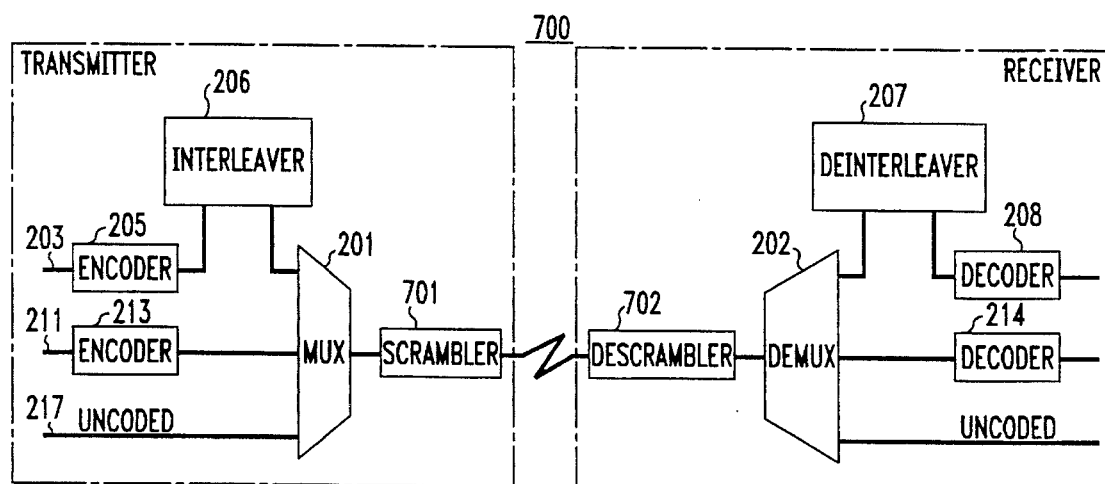
FIG. 7 is a block schematic diagram of the arrangement of FIG. 2 modified pursuant to the present invention.

Refer now to FIG. 7 which shows the present invention utilized in applications where a plurality of scrambled data streams are communicated between a transmitter and a receiver. For purposes of simplicity, the application shown in FIG. 2 for three data streams has been modified to incorporate the present invention. Comparing FIGS. 2 and 7, it is apparent that the same encoder, decoder, interleaver, deinterleaver, MUXs, and DEMUXs are utilized, and the same reference numerals are used for these elements in both FIGS. The significant difference between these FIGS. is that a single scrambler 701 is used in the transmitter and a single descrambler 702 is used in the receiver of FIG. 7. Note that the scrambler is disposed so as to receive the output of MUX 201 and scramble this output. The descrambler 702 receives this scrambled output, descrambles it, and provides the descrambled multiplexed data channels to DEMUX 202. Scrambler 701 and descrambler 702 can be implemented using any of the embodiments discussed above in reference to FIGS. 4–6.

It should, of course, be understood that while the present invention has been described in reference to illustrative embodiments, other arrangements may be apparent to those of ordinary skill in the art. For example, while the disclosed embodiments utilize discrete devices, these devices can be implemented using one or more appropriately programmed processors, special-purpose integrated circuits, digital processors, or an analog or hybrid counterpart of any of these devices.

What is claimed:

1. Apparatus comprising means for receiving a scrambled digital signal; and means for descrambling said received digital signal, said descrambling means being operative in first and second time intervals, said descrambling means descrambling said received scrambled signal in said first and second time intervals using a key signal, said descrambling means including means for forming said key signal, said key signal forming means forming said key signal in said first time interval in response to said received scrambled signal in this interval, said key signal forming means being unresponsive to said received scrambled signal in said second time interval;

wherein said descrambling means includes a means for controlling that examines an output of said descrambling means and controls the duration of said first time interval in response to this examination.

2. The apparatus of claim 1 wherein said key signal forming means during said second time interval is responsive to said key signal formed during said first time interval.

3. The apparatus of claim 1 wherein the examination provided by said examining means compares said output to a reference signal.

4. Apparatus comprising means for receiving a scrambled digital signal; and means for descrambling said received digital signal, said descrambling means being operative in first and second time intervals, said descrambling means descrambling said received scrambled signal in said first and second time intervals using a key signal, said descrambling means including means for forming said key signal, said key signal forming means forming said key signal in said first time interval in response to said received scrambled signal in this interval, said key signal forming means being unresponsive to said received scrambled signal in said second time interval wherein said descrambling means includes a means for controlling that examines an output of said descrambling means and controls the duration of said first time interval in response to this examination wherein said key signal forming means combines values of said received scrambled signal at different times.

5. The apparatus of claim 4 wherein said key signal forming means during said first time interval combines the values of said received scrambled signal at a plurality of different times during this first time interval.

6. The apparatus of claim 4 wherein said key signal forming means during said second time interval combines the values of said key signal at different times within said first time interval.

7. Apparatus comprising means for receiving a scrambled digital signal: and means for descrambling said received digital signal, said descrambling means being operative in first and second time intervals, said descrambling means descrambling said received scrambled signal in said first and second time intervals using a key signal, said descrambling means including means for forming said key signal, said key signal forming means forming said key signal in said first time interval in response to said received scrambled signal in this interval, said key signal forming means being unresponsive to said received scrambled signal in said second time interval wherein said descrambling means includes a means for controlling that examines an output of said descrambling means and controls the duration of said first time interval in response to this examination wherein said descrambling means key signal forming means includes means for storing prior values of said received scrambled signal at a plurality of times.

8. The apparatus of claim 1 wherein said received scrambled signal is a multiplexed one and descrambling means provides a multiplexed output signal, and said apparatus further includes means for demultiplexing said multiplexed output signal.

9. The apparatus of claim 8 wherein the multiplexed received scrambled signal includes coded signals and said apparatus further includes at least one decoder coupled to an output of said demultiplexing means.

10. The apparatus of claim 9 wherein the coded signal includes at least one coded interleaved signal and said apparatus further includes at least one deinterleaver coupled to an output of said demultiplexing means.

11. Apparatus comprising means for receiving a digital data signal; and means for scrambling said received digital data signal, said scrambling means being operative in first and second time intervals, said scrambling means scrambling said received digital data signal in said first and second time intervals using a key signal, said scrambling means including means for forming said key signal in said first and second time intervals, in said first time interval said forming means being responsive to the scrambled digital data signals in said first time interval and, in said second time interval, said forming means being unresponsive to said scrambled digital data signal in said second time interval;

wherein said scrambling means includes means for storing prior values of said scrambled digital data signal at a plurality of times.

12. Apparatus comprising means for receiving a digital data signal; and means for scrambling said received digital data signal, said scrambling means being operative in first and second time intervals, said scrambling means scrambling said received digital data signal in said first and second time intervals using a key signal, said scrambling means including means for forming said key signal in said first and second time intervals, in said first time interval said forming means being responsive to the scrambled digital data signals in said first time interval and, in said second time interval, said forming means being unresponsive to said scrambled digital data signal in said second time interval wherein said scrambling means includes means for storing prior values of said scrambled digital data signal at a plurality of times, wherein said scrambling means forms said key signal by combining values of said received scrambled signal at different times.

13. Apparatus comprising means for receiving a digital data signal; and means for scrambling said received digital data signal, said scrambling means being operative in first and second time intervals, said scrambling means scrambling said received digital data signal in said first and second time intervals using a key signal, said scrambling means including means for forming said key signal in said first and second time intervals, in said first time interval said forming means being responsive to the scrambled digital data signals in said first time interval and, in said second time interval, said forming means being unresponsive to said scrambled digital data signal in said second time interval wherein said scrambling means includes means for storing prior values of said scrambled digital data signal at a plurality of times, wherein said scrambling means forms said key signal during said first time interval by combining values of said scrambled digital data signal at a plurality of times during this first time interval.

14. Apparatus comprising means for receiving a digital data signal; and means for scrambling said received digital data signal, said scrambling means being operative in first and second time intervals, said scrambling means scrambling said received digital data signal in said first and second time intervals using a key signal, said scrambling means including means for forming said key signal in said first and second time intervals, in said first time interval said forming means being responsive to the scrambled digital dater signals in said first time interval and, in said second time interval, said forming means being unresponsive to said scrambled digital data signal in said second time interval wherein said scrambling means includes means for storing prior values of said scrambled digital data signal at a plurality of times, wherein said scrambling means forms said key signal during said second time interval by combining values of said key signal formed at a plurality of times within said first time interval.

15. The apparatus of claim 11 wherein said received digital data signal is a multiplexed one and apparatus includes multiplexing means serially connected to an input of said scrambling means.

16. The apparatus of claim 15 wherein the multiplexed received digital data signal includes coded signals and said apparatus further includes at least one coder connected to an input of said multiplexing means.

17. The apparatus of claim 16 wherein the coded signal includes at least one coded interleaved signal and said apparatus further includes at least one interleaver coupled to an input of said multiplexing means.

* * * * *